(12) United States Patent
Kazmierski

(10) Patent No.: US 11,398,956 B2
(45) Date of Patent: Jul. 26, 2022

(54) MULTI-EDGE ETHERCHANNEL (MEEC) CREATION AND MANAGEMENT

(71) Applicant: Cisco Technology, Inc., San Jose, CA (US)

(72) Inventor: Mariusz Kazmierski, Wieliczka Malopolski (PL)

(73) Assignee: Cisco Technology, Inc., San Jose, CA (US)

( * ) Notice: Subject to any disclaimer, the term of this patent is extended or adjusted under 35 U.S.C. 154(b) by 55 days.

(21) Appl. No.: 16/931,209

(22) Filed: Jul. 16, 2020

(65) Prior Publication Data
US 2022/0021586 A1    Jan. 20, 2022

(51) Int. Cl.
| | |
|---|---|
| *H04L 41/12* | (2022.01) |
| *H04L 67/56* | (2022.01) |
| *H04L 41/14* | (2022.01) |
| *H04L 67/1004* | (2022.01) |
| *H04L 67/141* | (2022.01) |

(52) U.S. Cl.
CPC .............. *H04L 41/14* (2013.01); *H04L 41/12* (2013.01); *H04L 67/1004* (2013.01); *H04L 67/141* (2013.01); *H04L 67/28* (2013.01)

(58) Field of Classification Search
CPC ..... H04L 41/14; H04L 41/12; H04L 67/1004; H04L 67/141; H04L 67/28
See application file for complete search history.

(56) References Cited

U.S. PATENT DOCUMENTS

| | | | |
|---|---|---|---|
| 3,262,802 A | 7/1966 | Young et al. | |
| 8,650,286 B1 * | 2/2014 | Sajassi ................. | H04L 45/586 709/224 |
| 8,913,489 B2 * | 12/2014 | Vinayagam ........... | H04L 49/552 370/392 |
| 9,264,302 B2 | 2/2016 | Ernstrom et al. | |
| 9,774,401 B1 * | 9/2017 | Borrill ................. | H04L 9/0852 |
| 10,171,306 B2 | 1/2019 | Pai et al. | |
| 10,270,645 B2 | 4/2019 | Ramasubramanian et al. | |
| 10,791,168 B1 * | 9/2020 | Dilley ..................... | H04L 41/22 |
| 2016/0323179 A1 | 11/2016 | Wang et al. | |

FOREIGN PATENT DOCUMENTS

WO    WO2015077878 A1    6/2015

OTHER PUBLICATIONS

The International Search Report and Written Opinion for PCT Application No. PCT/US21/39402, dated Oct. 26, 2021, 37 Pages.

* cited by examiner

*Primary Examiner* — Sm A Rahman
(74) *Attorney, Agent, or Firm* — Lee & Hayes, P.C.

(57) ABSTRACT

Systems and methods of creating and managing a multi-edge EtherChannel (MEEC) include, with a control node communicatively coupled to a plurality of edge nodes within a network, receiving including data defining a bundle of a plurality of links communicatively coupling the plurality of edge nodes and a first server and data identifying the first server. A map-notify message is sent to an edge node defining a link state for at least the first edge node. A map-proxy register message defining a plurality of link states for the plurality of the edge nodes within the bundle is sent to at least a second edge node to synchronize the first edge node with respect to at least the second edge node of the plurality of edge nodes. A map-reply message indicating load balancing data of a plurality of the edge nodes may be sent to an ingress edge node and data packets may be load balanced based on the load balancing data.

20 Claims, 10 Drawing Sheets

MULTI-EDGE ETHERCHANNEL (MEEC) CREATION AND MANAGEMENT

TECHNICAL FIELD

The present disclosure relates generally to enabling Multi-Edge EtherChannel (MEEC) for a software defined access (SDA) fabric. More specifically, this disclosure relates to providing support for a network interface card (NIC) teaming or bundling for customer end-hosts that are connected to an edge node in an SDA fabric through use of an control node functioning as a state machine and Map-Server/Map-Resolver (MSMR) device and without use of stacks or stack-wise virtual network configurations.

BACKGROUND

Link aggregation such as, for example, NIC teaming, includes the combining or aggregating of multiple network connections into a "bundle." This process may also be referred to as bundling. Bundling increases overall performance capabilities such that all links included within the bundle may be used for the same data processing request between an end-host and the network layer. Further, bundling provides a level of redundancy in case there occurs a failure in any link, device, or NIC within the network. For example, a stack of nodes such as switches may be implemented in which the switches are physically stacked and communicatively coupled to one another in a ring topology using a plurality of cables. Similarly, a virtual stack of nodes may be implemented. These implementations may be used where a single bundle is distributed among different physical devices allowing for bundle operations during a single device/link outage scenario.

However, in practice, it may not always be possible to have a stack or stackwise-virtual deployment available to a user. Further, even in situations where a stack or stackwise-virtual deployment is available but was not initially envisioned during a network design phase, it may not be practically possible to change a current network layout to introduce the functionality of a bundle. This may present a challenge during NIC teaming implementations for new end-hosts that require capabilities provided by bundling.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
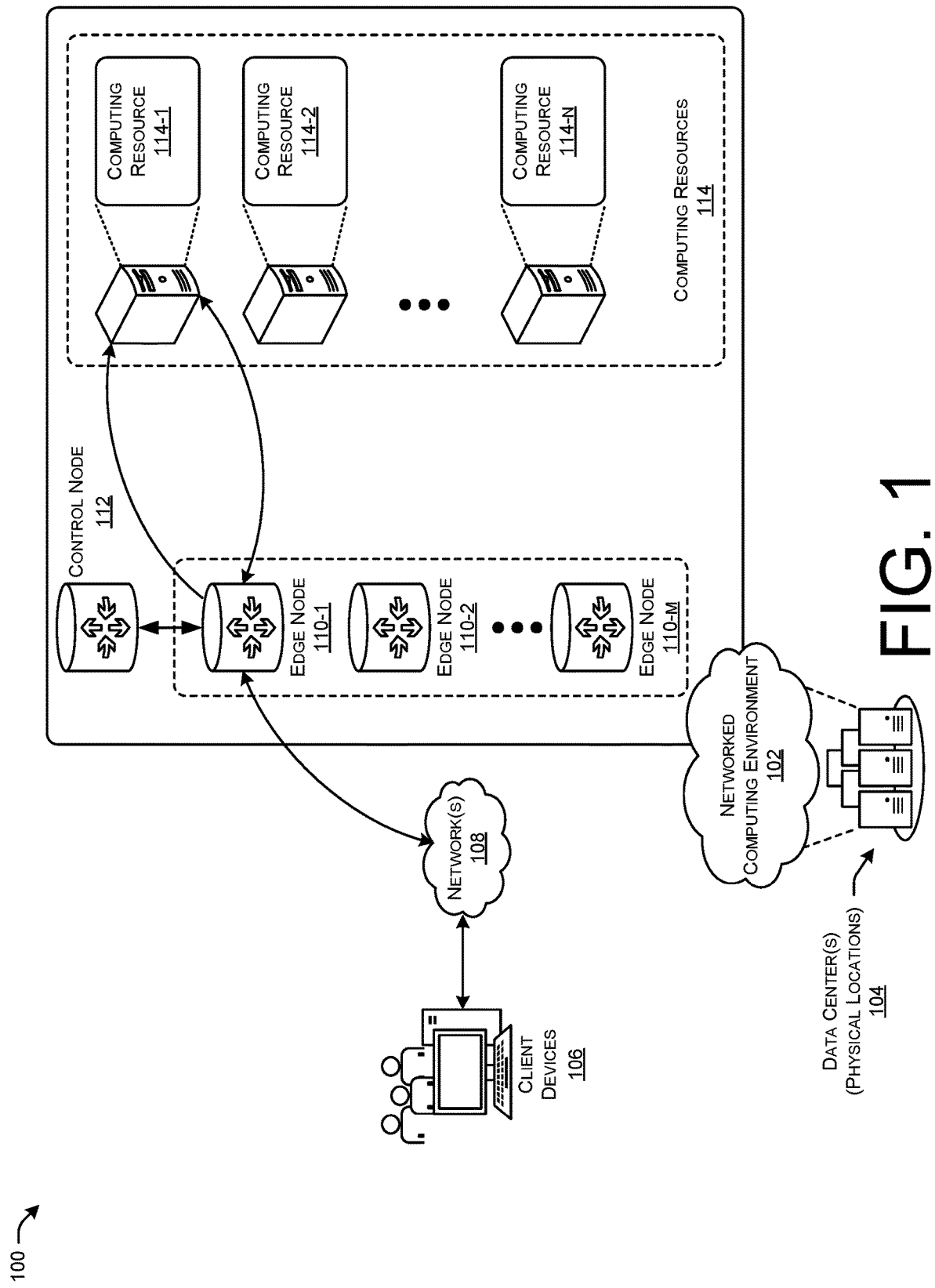
FIG. 1 illustrates a system-architecture diagram of an example networked computing environment for performing bundling, synchronizing, and load balancing of a plurality of edge nodes within an SDA with a control node, according to an example of the principles described herein.

This disclosure describes techniques for providing a multi-edge EtherChannel (MEEC) solution for a software-defined access (SDA) fabric. The MEEC, along with the systems and methods described herein, provides flexible and effective support for network interface card (NIC) teaming for a user end-host that may be communicatively coupled to any edge node in the SDA fabric. The present systems and methods described herein also remove multi-chassis design/ deployment limitations such as, for example, use of physical stacks or stack-wise virtual network configurations used in NIC teaming, and enables a scalable and redundant solution by leveraging protocols such as link aggregation control protocol (LACP) between a server and a number of edge devices and locator/identifier separation protocol (LISP) between the edge nodes and a control node.

Reference is made herein to bundling of links among a plurality of edge nodes within an MEEC. Bundling may refer to any type of link aggregation, and may also be referred as aggregating, teaming, trunking, bonding, channeling, and similar language. The control node serves as a locator/ID separation protocol (LISP) map-server/map-resolver (MSMR). Further, the control node serves as a link aggregation control protocol (LACP) state machine for synchronization purposes.

Examples described herein provide for bundling of links within an SDA fabric network. The system may include one or more processors, and one or more non-transitory computer-readable media storing instructions that, when executed by the one or more processors, cause the one or more processors to perform operations. The operations include, with a control node communicatively coupled to a plurality of edge nodes within a network, receiving a map-register message via a control plane communication protocol from a first edge node of the plurality of edge nodes. The map-register message includes first data defining a bundle of a plurality of links communicatively coupling the plurality of edge nodes and a first server via a data plane communication protocol, and second data identifying the first server to which the plurality of edge nodes included within the bundle are communicatively coupled. The operations further include sending a map-notify message to the first edge node. The map-notify message defining a link state for at least the first edge node.

The operations further include, with the control node, synchronizing the map-notify message defining a plurality of link states for the plurality of the edge nodes within the bundle between the first edge node and at least a second edge node of the plurality of edge nodes. The operations further include, with the control node, identifying processing load capabilities of the plurality of edge nodes, and balancing a processing load between at least the first edge node and at least a second edge node of the plurality of edge nodes based on the processing load capabilities of the plurality of edge nodes. The data plane communication protocol includes link aggregation control protocol (LACP) or port aggregation protocol (PAgP). The control plane communication protocol includes locator/identifier separation protocol (LISP), border gateway protocol (BGP), or Ethernet protocol.

The operations further include storing the first data and the second data for the plurality of edge nodes in a database of the control node, and creating a map-proxy register message for dissemination to the plurality of edge nodes to register the bundle of the plurality of links and the identification of the first server with the plurality of edge nodes. The operations further include, with the control node, defining a state of at least the first edge node. The operations further include, with the control node, receiving the map-register message via a control plane communication protocol from the first edge node, the map-register message further including a request to provide an indication of the first server to which a PDU packet from a second server is destined, sending a map-reply message indicating load balancing data of at least a second edge node and a third edge node of the plurality of edge nodes through which the first server is reachable, and sending the PDU packet to the first server via the second edge node or the third edge node based on the load balancing data. The indication of the first server includes an endpoint identification (EID) of the first server, and a routing locator (RLOC) of the plurality of edge nodes within the bundle.

From an edge node perspective, examples described herein provide for bundling of links within an SDA fabric network, synchronizing the edge nodes within the network, and performing load balancing to ensure efficient transmission of data within the network. A system includes one or more processors, and one or more non-transitory computer-readable media storing instructions that, when executed by the one or more processors, cause the one or more processors to perform operations. The operations include, with a first edge node of a plurality of edge nodes within a network, establishing a first communication session with a first server via a data plane communication protocol. The first communication session includes at least one protocol data unit (PDU) packet from the first server. The first edge node sends a map-register message via a control plane communication protocol to a control node communicatively coupled to the plurality of edge nodes. The map-register message includes a request to provide an indication of a second server to which the PDU packet is destined. The first edge node receives a map-reply message indicating load balancing data of at least a second edge node and a third edge node of the plurality of edge nodes through which the second server is reachable, and sends the PDU packet to the second server via the second edge node or the third edge node based on the load balancing data.

The map-register message further includes first data defining at least one bundle of a plurality of links communicatively coupling the plurality of edge nodes and the second server, and second data identifying the second server to which the plurality of edge nodes included within the bundle are communicatively coupled. The operations further include, with the first edge node, storing the first data and the second data in a database of the first edge node, creating a forwarding information base (FIB) table including the first data, the second data, and third data defining a load capacity of at least the first edge node. The operations further include receiving, from the control node, a map-notify message, the map-notify message defining a link state for at least the first edge node.

The operations further include, with the first edge node, receiving a map-proxy register message. The map-proxy register message includes a network address of the second server. The operations further include, with the first edge node, storing the network address of the second server in the database and the FIB table. The operations further include, receiving a map-proxy register message. The map-proxy register message includes a state of the at least the second edge node of the plurality of edge nodes. The operations further include storing the state of at least the second edge node in the database and the FIB table to synchronize the first edge node with the plurality of edge nodes.

From a perspective of a control node, examples described herein provide for methods of bundling of links within an SDA fabric network, synchronizing the edge nodes within the network, and performing load balancing to ensure efficient transmission of data within the network. The method includes, with a control node communicatively coupled to a plurality of edge nodes within a network, receiving a map-register message via a control plane communication protocol from at least a first edge node of the plurality of edge nodes. The map-register message includes first data defining at least one bundle of a plurality of links communicatively coupling the plurality of edge nodes and a server, and second data identifying the server to which the plurality of edge nodes included within the bundle are communicatively coupled. The method further includes sending a map-proxy register message defining a plurality of link states for the plurality of the edge nodes within the bundle to at least a second edge node to synchronize the first edge node with respect to at least the second edge node of the plurality of edge nodes.

The method further includes registering the first data and the second data for the plurality of edge nodes in a database of the control node and sending a map-notify message to the first edge node, the map-notify message defining a first link state for at least the first edge node. The method further includes identifying processing load capabilities of the plurality of edge nodes and balancing a processing load between at least the first edge node and at least the second edge node of the plurality of edge nodes based on the processing load capabilities of the plurality of edge nodes.

The method further includes defining an ingress edge node among the plurality of edge nodes to receive a data packet directed to the server, and receiving, from the ingress edge node, a map-request to determine an endpoint identification (EID) of the server, and a routing locator (RLOC) of the plurality of edge nodes within the bundle. The method further includes sending a map-reply message to the ingress edge node. The map-reply message includes third data defining the EID of the server, fourth data defining the RLOC of the plurality of edge nodes within the bundle, and fifth data defining processing load capabilities of the plurality of edge nodes. The method further includes receiving, from the ingress edge node, a routing indication of at least the second edge node of the plurality of edge nodes through which load balanced traffic is to be directed based on the fifth data, and directing the data packet to the server based on the routing indication.

Thus, the systems and methods described herein provide node devices that are not required to be stacked physically with associated stacked-device wiring. This avoids a stack switch network configuration where the node devices have to otherwise perform control plane processes for synchronization purposes. Further, the systems and methods described herein avoid LACP convergence between edge nodes using "dedicated" protocol used for LACP convergence to ensure that the edge nodes acting as state machines are in sync. This processing is instead pushed to the control node 112 such that the control node 112 functions as a LISP map-server/map-resolver (MSMR) device as well as the LACP state machine.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

As discussed above, bundling increases overall performance capabilities within an SDA fabric such that all links included within the bundle may be used for the same data processing request between an end-host and the network layer. Further, bundling provides a level of redundancy in case there occurs a failure in any link, device, or NIC within the network. For example, a stack of nodes such as switches may be implemented in which the switches are physically stacked and communicatively coupled to one another in a ring topology using a plurality of cables. Similarly, a virtual stack of nodes may be implemented. These implementations may be used where a single bundle is distributed among different physical devices allowing for bundle operations during a single device/link outage scenario. Should a device/link outage occur, the ability to maintain a bundled number of links in the MEEC may prove difficult, and synchronization and load-balancing between edge nodes may be compromised. Therefore, a control node acting as a LISP map-server/map-resolver (MSMR) device and an LACP state machine allows for the control plane operations to be relieved from the edge nodes and placed on the control node.

Accordingly, this disclosure describes techniques for creating and managing a MEEC using a control node communicatively coupled to a plurality of edge nodes within the SDA fabric. The control node is able to bundle links between the edge nodes and a computing resource such as a server and maintain and manage the bundle including the addition or deletion of edge nodes with respect to the bundle. Further, the control node synchronizes the states to the edge nodes. Still further, the control node performs load balancing of network traffic among the nodes to efficiently transmit data packets within the network.

As used herein, the term "computing resource" may comprise one or more of a computer, server computer, virtual machine, virtual server, router, switch (e.g., top of rack switch), gateway, communication node, backend node, load balancer, and the like. Additionally, a computing resource may comprise one or more computing resources.

The techniques described herein are generally applicable to any type of computing device or communication node of a networked computing environment. Additionally, the techniques are equally applicable to any type of communication protocol and packet structure.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example networked computing environment 102 for performing bundling, synchronizing, and load balancing of a plurality of edge nodes 110 within an SDA with a control node 112, according to an example of the principles described herein. The networked computing environment 102 may include devices that are housed or located in one or more data centers 104 that may be located at different physical locations. For instance, the networked computing environment 102 may be supported by networks of devices in a public cloud computing platform, a private/enterprise computing platform, and/or any combination thereof. The one or more data centers 104 may be physical facilities or buildings located across geographic areas that are designated to store networked devices that are part of the networked computing environment 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the networked computing environment 102 may not be located in explicitly defined data centers 104 and, rather, may be located in other locations or buildings.

The networked computing environment 102 may be accessible to client devices 106 over one or more networks 108, such as the Internet. The networked computing environment 102, and the networks 108, may each respectively include one or more networks implemented by any viable communication technology, such as wired and/or wireless modalities and/or technologies. The networked computing environment 102 and networks 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The networked computing environment 102 may include devices, virtual resources, or other nodes that relay data packets from one network segment to another by nodes in the computer network.

In some examples, the networked computing environment 102 may provide, host, or otherwise support one or more application services for client devices 106 to connect to and use. The client devices 106 may comprise any type of device configured to communicate using various communication protocols (e.g., VPN, SSL, TLS, DTLS, and/or any other protocol) over the networks 108. For instance, the client device 106 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device.

In some examples, the networked computing environment 102 may include a plurality of edge nodes 110-1, 110-2, 110-N, where N is any integer greater than or equal to 1 (collectively referred to herein as edge node(s) 110 unless specifically addressed otherwise). Edge nodes may include any device that provides an entry point into the networked computing environment 102 or another enterprise, fabric, service provider network, and/or computing resource, including, for example, routers, switches, and access points, among other types of edge nodes. As used herein and in the appended claims, the term "computing resource" may comprise one or more of a computer, server computer, virtual machine, virtual server, router, switch (e.g., top of rack switch), gateway, communication node, backend node, and load balancer, among others. Additionally, a computing resource may comprise one or more computing resources. In one example, the edge nodes 110 may provide an entry point into the networked computing environment 102 including at least one of the computing resources 114-1, 114-2, 114-N, where N is any integer greater than or equal to 1 (collectively referred to herein as computing resource(s) 114 unless specifically addressed otherwise). The edge nodes 110 described herein may include, for example, switches, routers, gateways, communication nodes, and the like. The edge nodes 110 may serve to identify and authenticate endpoints within the networked computing environment 102, register data defining an identification (ID) data of the endpoint and/or transmit the ID data of the endpoint to the control node 112, function as a gateway (e.g., a layer 3 gateway) for the endpoints, perform encapsulation and/or de-encapsulation of data traffic to and from the endpoints, among other functions described herein.

The edge nodes 110 are communicatively coupled to the computing resources 114 using the Multi-Edge EtherChannel (MEEC) network topology and functionalities described herein. A control node 112 communicatively coupled to the edge nodes 110 controls the bundling, synchronizing, and load balancing, among other functionalities of the edge nodes 110 with respect to the computing resources 114.

The networked computing environment 102 made possible by the control node 112, the edge nodes 110, and the computing resources 114 and the SDA fabric formed thereby through the MEEC solution described herein provides fault-tolerance, redundant links between the edge nodes 110, and high-speed links between the client devices 106, the edge nodes 110 and the computing resources 114 (e.g., servers). Further, the networked computing environment 102 described herein provides support for network interface card (NIC) teaming for the client devices 106 acting as end-hosts. The networked computing environment 102 is also scalable as any number of edge nodes 110 may be added or removed from the networked computing environment 102 as is described herein.

Figure 2:
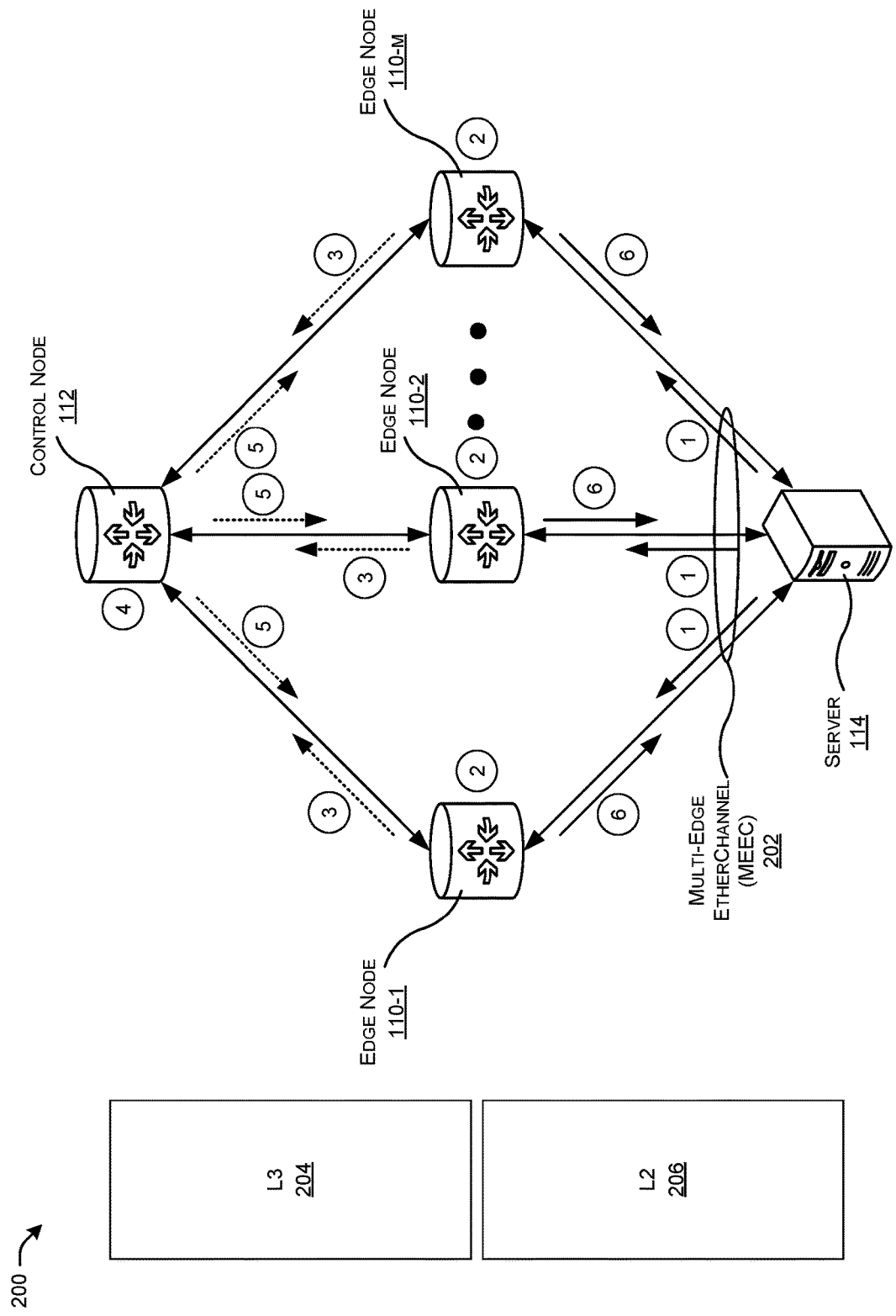
FIG. 2 illustrates a network topology diagram including a Multi-Edge EtherChannel (MEEC) for an SDA fabric depicting a bundling of edge nodes, according to an example of the principles described herein.

FIG. 2 illustrates a network topology diagram 200 including a Multi-Edge EtherChannel (MEEC) 202 for an SDA fabric, according to an example of the principles described herein. FIG. 2 further depicts a process by which a number of edge nodes 110 are bundled and maintained via a bundle state machine. As depicted in FIG. 2, a plurality of edge nodes 110 are communicatively coupled to a computing resource 114 depicted in FIG. 2 as a server. Further, the control node 112 is communicatively coupled to the edge nodes 110. The edge nodes 110 and the connection between the edge nodes 110 and the server 114 may be included within the layer 2 (L2) 206 of the of the Open System Interconnection (OSI) model as defined by the International Organization of Standardization (ISO) (e.g., the data link layer). Thus, the communications between the edge nodes 110 and the server 114 are based on a data link layer host-router protocol. In this manner, L2 206 is responsible for ensuring that data transfers between the edge nodes 110 and/or the server 114 are error free as data packets are transmitted over a physical layer. Further, the edge nodes 110 and/or the server 114 are tasked with management of the transmitting of data frames sequentially, sending and expecting acknowledgements for frames received and sent, respectively, resending of non-acknowledgement received frames, establishing a logical layer between two nodes and also manages the Frame traffic control over the network.

Any L2 206 protocol may be used to form logical bundles from the perspective of the server 114. For example, link aggregation control protocol (LACP), port aggregation protocol (PAgP), or another protocol may be used to logically aggregate Ethernet switch ports among the edge nodes 110. As to LACP, within the IEEE specification (e.g., 802.3 ad or 802.1 ax), the LACP provides a method to control the bundling of several physical ports together to form a single logical channel. LACP allows a network device to negotiate an automatic bundling of links by sending LACP packets to a peer device such as the edge nodes 110 or another directly connected device that also implements LACP such as the server 114. PAgP is a networking protocol utilized for automated, logical aggregation of Ethernet switch ports (e.g., an EtherChannel). PAgP may be configured on a switch such as the edge node 110 to operate in in an "auto" mode employing passive negotiation of the channel, a "desirable" mode employing active negotiation of the channel, and an "on" mode where no protocols are used and it is assumed the other device such as the server 114 has enabled link aggregation. Whatever L2 206 protocol is executed, the protocol is utilized to form a logical bundle from the server 114 perspective.

The control node 112 and the connection between the control node 112 and the edge nodes 110 may be included within the layer 3 (L3) 204 (e.g., the network layer) of the OSI model. Thus, communications between the edge nodes 110 and the control node 112 at L3 204 are based on a network layer host-router protocol. In this manner, the control node 112 routes signals and acts as a network controller to determine which route data should take as the data is transmitted through the networked computing environment 102. Any L3 206 protocol may be used within the SDA fabric formed by the edge nodes 110, the control node 112 and the server 114 to map and encapsulate communications between the edge nodes 110 and the control node 112.

In one example, locator/identifier separation protocol (LISP) may be used as the L3 206 protocol. LISP is a "map-and-encapsulate" protocol where the idea of the separation is that the Internet architecture combines two functions of routing locators (where a client is attached to the network) and identifiers (who the client is) in one number space; namely, the IP address. LISP supports the separation of the IPv4 and IPv6 address space following a network-based map-and-encapsulate scheme. In LISP, both identifiers and locators may be IP addresses or arbitrary elements like a set of GPS coordinates or a MAC address. Thus, LISP implements the use of two namespaces instead of a single IP address; namely, Endpoint Identifiers (EIDs) assigned to end hosts such as the control node 112, and Routing Locators (RLOCs) assigned to devices such as the edge nodes 110 that make up the global routing system. LISP is an address-family agnostic solution used in an SDA fabric, and acts as a "glue" between the control node 112 and the edge nodes 110. Further, LISP provides a communication channel between the control node 112 and the edge nodes 110 to keep in sync an LACP state on all independent SDA Edge Nodes. In this manner, the control node 112 functions as a LISP map-server/map-resolver (MSMR) device as well as an LACP state machine. An exact format of the LISP address-family may take any form as may fit an implementation of the present systems and methods.

In one example, border gateway protocol (BGP) may be used as the L3 206 protocol. BGP is a standardized exterior gateway protocol designed to exchange routing and reachability information among autonomous systems. BGP is classified as a path-vector routing protocol, and makes routing decisions based on paths, network policies, or rule-sets configured by a network administrator. In one example, Ethernet protocol may be used as the L3 206 protocol.

Use of LACP at L2 206 and LISP at L3 204 removes the need for physical connections between independent and dependent devices in the form of horizontal and/or vertical stacking, virtual Port-Channels (vPC), and stack-cable devices and wiring, among similar physical connections. Further, the use of the present network topology and methods of bundling described herein may be implemented after a design phase and/or an implementation phase of a network to dynamically bundle additional edge nodes 110 together.

As depicted in FIG. 2 at 1 the server 114 and the edge nodes 110 may exchange a number of protocol data units (PDUs). A PDU, as a single unit of information transmitted among peer entities of a computer network such as the server 114 and the edge nodes 110, is composed of protocol-specific control information and user data. The edge nodes 110 include LACP packet processing logic to, at 2, register system and link properties to the SDA control node 112 via LISP. In this manner, the edge nodes 110 are responsible for sending and receiving data packets with respect to the server 114. In one example, the server 114 may include a number of links to the various edge nodes 110, and may, in some instances, may have less than all of the links active or may include priorities for data packet transfers to the edge nodes 110. As described herein, control plane processing is pushed to the control node 112 and the edge nodes 110 are tasked with data-plane processing of data packets.

At 3, the edge nodes 110 prepares and transmits a LISP map-register message including the system and link properties of that respective edge node 110 and associated link to the control node 112. A map-register message is a LISP message sent by an Egress Tunnel Router (ETR) (e.g., one or more of the edge nodes 110) to a map-server (e.g., control node 112) to register its associated endpoint identifier (EID) prefixes. In addition to the set of EID-prefixes to register, the message includes one or more routing locators (RLOCs) to be used by the map-server when forwarding map-requests (re-formatted as encapsulated map-requests) received through the database mapping system. An ETR may request that the map-server answer map-requests on its behalf by setting the "proxy map-reply" flag (P-bit) in the message. Thus, when the LACP PDUs are received from the server 114 at the respective edge nodes 110, information about the actor (i.e. server settings: system-identification (sys-id), priority, among other information) is passed to LISP which registers the new link via the LISP map-register message to the control node 112. In one example, the information contained within the map-register message may include system attributes such as system priorities and the sys-id, link attributes such as port keys, priorities, port-numbers, and LACP state, among other types of information.

At 4, when the control node 112 receives the LISP Map-register message from the edge nodes 110. The control node 112 registers the received system and link attributes defined within the LISP Map-register message into a LISP database included in a memory device of the control node 112. Details for a given bundle including independent links received from the fabric of the edge nodes 110 may be uniquely split into distinct bundles based on the system-id of the server 114. Further, the LISP Map-register message maybe passed to a processing device of the control node 112 including LACP state-machine processing logic to determine if a given link should be put into one of a number of states. The states may include, for example, a bundled state, a hot-standby state, an active state, an inactive state, among other states. In this manner, the control node 112 serves as a LACP state-machine.

A LISP Map-notify message may be prepared at the control node 112 and transmitted at 5 to at least one edge node 110 to notify the edge node 110 of the link state from the LACP perspective determined at 4. A map-Notify message is a LISP message sent by a map-server (e.g., the control node 112) to an ETR (e.g., e.g., one or more of the edge nodes 110) to confirm that a map-register has been received and processed. An ETR requests that a map-notify message be returned by setting the "want-map-notify" flag (M-bit) in the map-register message. Unlike a map-reply message, a map-notify message uses UDP port 4342 for both source and destination. After the LACP state-machine processing at the control node 112, the results are passed to a LISP device of the control node 112 to send this information back to all relevant independent SDA edge nodes 110. This, in turn, triggers interface state changes and/or generates proper LACP PDU frames to be directed towards the server 114.

The server 114, at 6, consumes the received LACP PDU packets received from the independent edge nodes 110. At this point, the server 114 does not realize that specific links may be connected to different edge nodes since all the edge nodes 110 are characterized by the same system attributes and link attributes and the port-values of the edge nodes 110 are adjusted accordingly to assure unique identification among the edge nodes 110. LACP control-plane signaling (e.g., via a data plane communication protocol) occurs at 1 and 6 as indicated by the solid arrows, and LISP control-plane signaling (e.g. via a control plane communication protocol) occurs are 3 and 5 as indicated by the dashed arrows.

Other functionality supported by the LACP protocol such as, for example, link up/down events, and adding and/or removing links to the bundle, among other event may be processed as per the logic presented herein that allows the LISP protocol to act as a transport protocol between LACP packet processing logic that exists on edge node and LACP state machine logic that exists on the control node 112. Thus, the process described at FIG. 2 provides for the proper establishment of an MEEC 202 between multiple edge nodes 110 and the server 114 in a dynamic manner via the execution of the functionality of the control node 112. The LACP functionality and logic is decoupled from the edge nodes 110 by ensuring that the LACP packet processing logic responsible for receiving and transmitting LACP PDUs remains on the SDA edge nodes 110 and removing LACP state machine logic responsible for deciding any changes in LACP state machine and link bundling and/or unbundling to the SDA control node 112. In this manner, control processing is removed from the edge nodes 110 and are handled by the control node 112. The central decision point for LACP protocol processing is moved to the control node 112 to provide support for all native LACP logic. The LACP logic may include, for example, LACP max-bundle functionality to set a limit to a maximum number of active links connected to independent edge nodes 110 at any given point in time. The LACP logic may also include LACP port-priority functionality to order links in the bundle connected to various independent edge nodes 110, from a most preferred link to a least preferred link.

The control node 112 may be located anywhere physically, communicatively, and/or logically with respect to the edge nodes 110 and the server 114. For example. the control node 112 may be located in a cloud networking infrastructure where the processing capabilities of the control node 112 described herein are provided over an intranet, the Internet or other network connection. In an example where the control node 112 is cloud-based, a Layer 3 control protocol may be utilized. Further, in one example, the functionality of the control node 112 may be provided locally on a computing device where the control node 112 is physically to the networked computing environment layer 2 communication protocols such as Ethernet protocols. Still further, the functionalities of the control node 112 may be provided as software as a service (SaaS) or any centrally hosted, web-based software.

According to the above process described in connection with FIG. 2, any number of edge nodes 110 may be added to the networked computing environment 102. Further, the edge nodes 110 may be identified as being included in a bundle of the MEEC 202 based on the process described in connection with FIG. 2. Thus, a newly added edge node 110 as well as a legacy edge node 110 may be bundled within the MEEC 202. Further, in one example, the edge nodes 110 may be included within a plurality of different MEECs 202 and may be controlled nu the control node 112 via different system identification values such as MAC addresses in the LISP database of the control node 112. Thus, any number of bundles that include any number of the edge nodes 110 may be identified by separate servers 114 and controlled via the control node 112.

Figure 3:
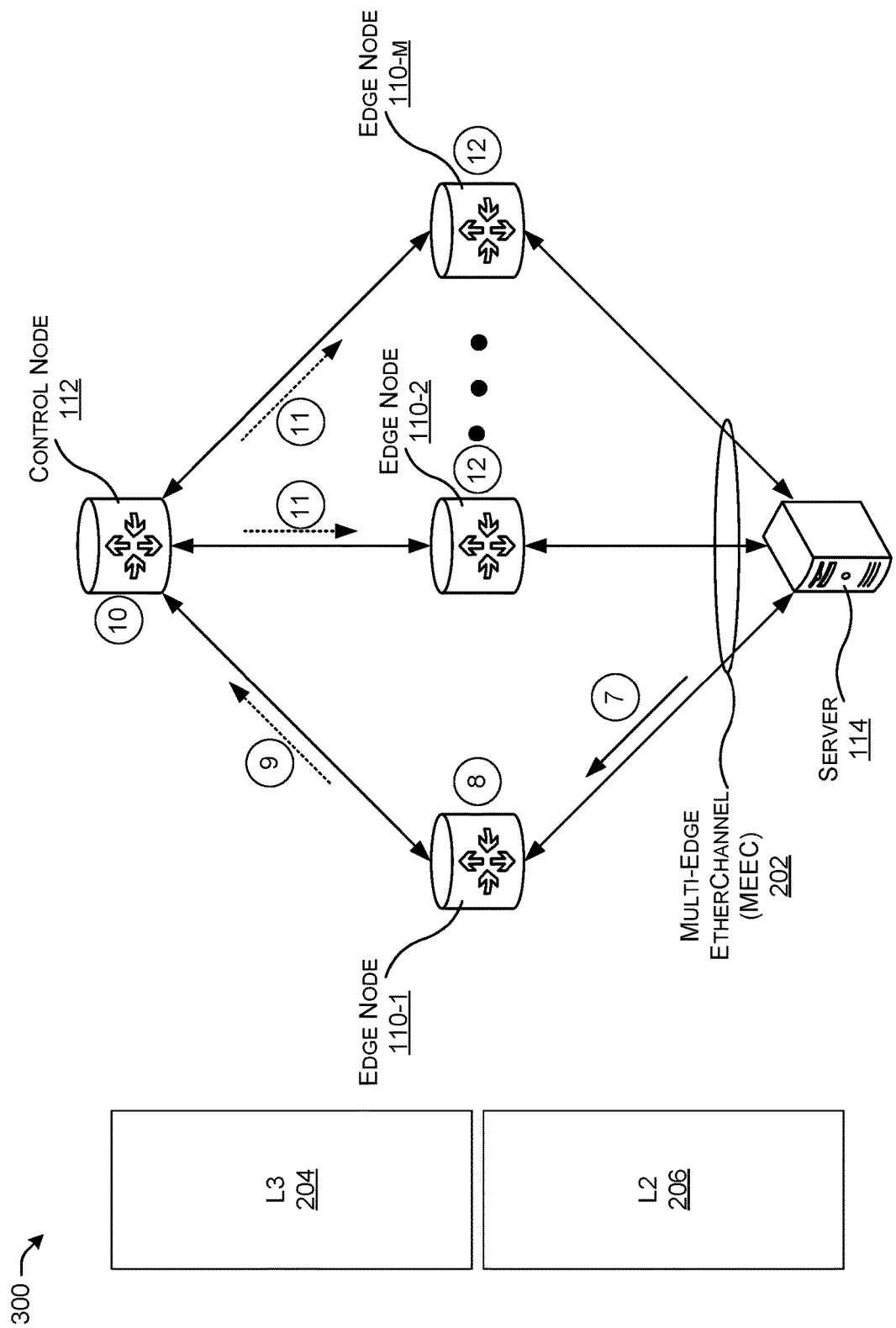
FIG. 3 illustrates a network topology diagram including a Multi-Edge EtherChannel (MEEC) for an SDA fabric depicting a synchronization of edge nodes, according to an example of the principles described herein.

FIG. 3 illustrates a network topology diagram 300 including a Multi-Edge EtherChannel (MEEC) 202 for an SDA fabric, according to an example of the principles described herein. FIG. 3 further depicts a process of synchronizing system data between the edge nodes 110. As the MEEC 202 is established between the server 114 and a plurality of the edge nodes 110, the server 114 may send data-plane packets. The data plane packets may include an address resolution protocol (ARP) packet transmitted by an edge node 110 to obtain information about a default gateway such as in internet protocol (IP) address, and a dynamic host configuration protocol (DHCP) packet to obtain an IP address from a DHCP Server, among other types of packets and messages. The server 114 may load-balance the packets as per logic of the server 114 and send the packets over one of the links between the server 114 and the edge nodes 110 towards one of the edge nodes 110 in the SDA fabric. Thus, at 7 as indicated by the solid arrow depicted in FIG. 3, a first data plane packet may be sent to edge node 110-1 as data plane traffic.

At 8, when one of the edge nodes 110 such as edge node 110-1 receives the packet from the server 114, the edge node 110-1 may process the packet by the LISP process as per a default SDA fabric logic performed by the edge node 110-1. The edge node 110-1 (as well as other edge nodes 110) may include a LISP database included in a memory device of the edge node 110-1. The source MAC address of the frame may be registered at the edge node 110-1 and added to the local LISP database of the edge node 110-1. In one example, the MAC address of the server 114 may also be stored within a layer 2 forward information base (L2FIB). The L2FIB is used in network routing and similar functions to find the proper output network interface to which the input interface should forward the packet. The L2FIB may be a dynamically updated table that maps MAC addresses to ports such as the MAC address of the server 114 to a port of the edge node 110-1.

The edge node 110-1 may transmit a LISP map-register message at 9 to the SDA control node 112. The edge node 110-1 does so using LISP control-plane signaling as indicated by the dashed arrows. The usage details and message format of a Map-Register message may be defined by RFC6833 Internet Society (ISOC) standards. Further at 12, (as described in more detail below) the server MAC address is registered in the LISP databases and the L2FIB of each edge node 110 within the bundle, including edge nodes 110-2 and 110-N as depicted in FIG. 3.

At 10, the control node 112 receives the LISP map-register message for a given MAC address that belongs to the bundle such as the MAC address of the server 114. The control node 112 adds the MAC address to the LISP database included in the memory device of the control node 112. A list of all edge nodes 110 that belong to a given bundle is known to the control node 112 as the networked computing environment 102 is dynamically formed as described above in connection with FIG. 2. In one example, the RLOCs of the edge nodes 110 are also stored in the LISP database. Further, in one example, weights related to load balancing may be assigned by the control node 112 to the links between the edge nodes 110 and the server 114 to designate data transfer capabilities of the edge nodes 110.

In order to synchronize the edge nodes 110 within a bundle and with respect to one another, each edge node 110 may includes a LISP database in a memory device of each of the edge nodes 110. The LISP database of each of the edge nodes 110 may store the MAC address of the server 114. Thus, the control node 112 may also create and transmit a LISP map-proxy register message at 11 as indicated in FIG. 3. A map-proxy register message is a type of message used in an SDA solution for fabric wireless to register a radio MAC address from a wireless local area network (LAN) controller (WLC) on an edge node. The LISP map-proxy register message is sent to least one of the other SDA edge nodes 110 that has an active link included within the bundle such as, for example, edge nodes 110-2, 110-N. This allows the at least one other SDA edge node 110 to also register the source MAC address of the server 114 at 12. As a result, all independent edge nodes 110 that are in the same bundle (e.g., are Multi-Edge EtherChannel (MEEC) enabled), may be fully synchronized from a MAC programming perspective and a packet forwarding perspective.

Figure 4:
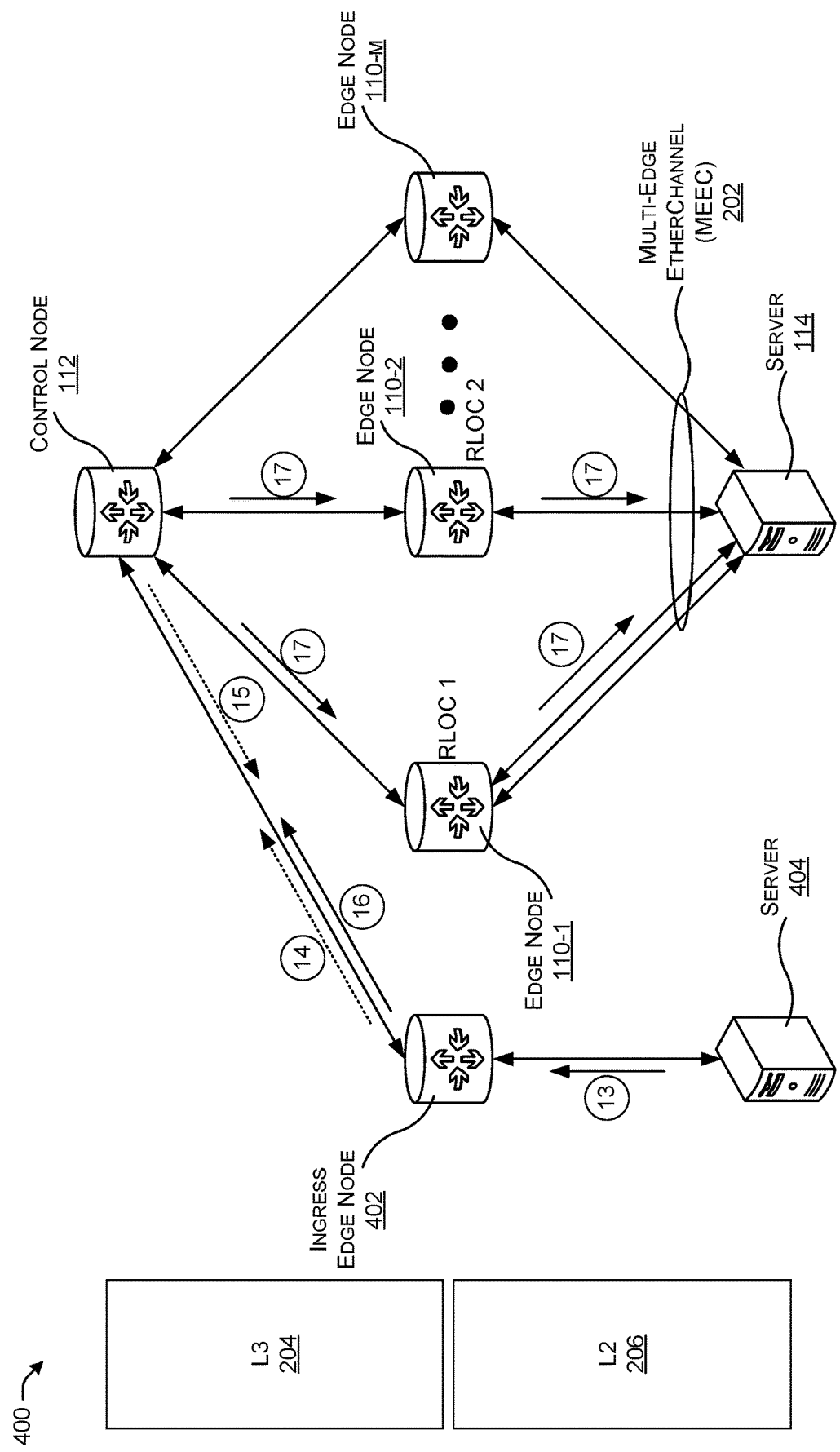
FIG. 4 illustrates a network topology diagram including a Multi-Edge EtherChannel (MEEC) for an SDA fabric depicting a load balancing of network traffic, according to an example of the principles described herein.

FIG. 4 illustrates a network topology diagram 400 including a Multi-Edge EtherChannel (MEEC) 202 for an SDA fabric, according to an example of the principles described herein. FIG. 4 further depicts a process of load balancing of network traffic within the networked computing environment 102. As used herein, load balancing refers to the process of distributing data packet transmission over a set of resources such as the edge nodes 110, with the aim of making their overall data packet transmission processing more efficient, optimize the response time for each data packet transmission, and avoid unevenly overloading one or more of the edge nodes 110 nodes while other edge nodes 110 are left idle.

As depicted in FIG. 4, a second server 404 is attempting to communicate with the first server 114 to which the edge nodes 110 are communicatively coupled. In the example of FIG. 4, the nodes are in sync as described above in connection with the processes of FIG. 3 due to the manner in which the control node 112 operates as the LISP map-server/map-resolver (MSMR) device as well as the LACP state machine.

At 13, a data packet may be transmitted from the second server 404 to an edge node 110 designated by the control node 112 as an ingress edge node 402 within the networked computing environment 102. In order to do so, the ingress edge node 402 tunnels the data packet to the server 114 via the control node 112 and the other edge nodes 110. The data packet may be sent using an overlay network such as SDA. However, any overlay network may be used including, for example, generic routing encapsulation (GRE), multiprotocol label switching (MPLS), or virtual extensible LAN (VXLAN). GRE is a tunneling protocol that encapsulates a wide variety of network layer protocols inside virtual point-to-point links or point-to-multipoint links over an Internet Protocol network. MPLS is a routing technique that directs data from one node to the next based on short path labels rather than long network addresses, thus avoiding complex lookups in a routing table and speeding traffic flows. VXLAN is a network virtualization technology that uses a VLAN-like encapsulation technique to encapsulate OSI layer 2 Ethernet frames within layer 4 user datagram protocol (UDP) datagrams.

At 14, the ingress edge node 402 creates and sends a LISP map-request message to determine the server 114 (EID) to edge node 110 (RLOC) mapping. Based on the data stored in the LISP database of the control node 112, the control node responds at 15 with a LISP map-reply message that include the EID/RLOC mappings where each RLOC (e.g., RLOC1 and RLOC2) correspond to an edge node 110 where the MEEC 202 is configured. Further, the LISP map-reply message may also include load balancing weights for each link between the edge nodes 110 and the server 114. For example, the edge node 110-1 (designated as RLOC1) may be assigned a weight of 20 while edge node 110-2 (designated as RLOC2) is given a weight of 10. Thus, network traffic through edge node 110-1 may be load balanced such that it is double that of edge node 110-2. The control node 112 may not assign a network traffic load to edge node 110-N since edge node 110-N may be inactive or placed in some other state where network traffic is not directed through edge node 110-N. It is noted here that a plurality of EID/RLOC mappings are transmitted at 15 rather than a single mapping as may be expected in an SDA fabric with a single-connected end-host.

At 16, the ingress edge node 402 may transmit the data packet to one or more of the RLOCs identified by the control node 112 in a load balanced manner. For example, the ingress edge node 402 may send the data packet via RLOC1 and RLOC 2 in a load balanced manner. Thus, as a result, the ingress edge node 402 may have a plurality of points of exit towards the egress edge node (e.g., edge node 110-1 and/or edge node 110-2) and may select which egress edge node(s) the data packet should be sent to. In one example, the ingress edge node 402 may make such a decision based on an arbitrary algorithm such as a packet hash. In the example of FIG. 4, the ingress edge node 402, at 17, may send the data packets via edge node 110-1 and edge node 110-2 such that double the network traffic will be sent to edge node 110-1 with respect to the network traffic sent to edge node 110-2 since edge node 110-1 includes two links between edge node 110-1 and the server 114 whereas one link is included between edge node 110-2 and the server 114. Because the control node 112 functions as the LISP map-server/map-resolver (MSMR) device as well as the LACP state machine, the control node 112 may dynamically adjust the weights assigned to each link to allow network traffic to move most efficiently through the networked computing environment 102.

In one example, the edge nodes 110 may also participate in making load balancing decisions. In this example, an edge node 110-1 selected by the ingress edge node 402 as an egress edge node may load balance the network traffic on a number of port channels based on the L2FIB stored on the edge node 110-1. An L2FIB load-balancing methodology may be applied by the edge node 110-1 to accomplish the load balancing.

In some instances, one or more of the edge nodes 110 may fail, leaving the other edge nodes 110 within the networked computing environment 102 to perform the data packet processing. For example, in FIG. 4, if edge node 110-2 should fail, the control node 112 may dynamically adjust the transmission of traffic within the network such that, for example, edge node 110-1 handles more data transmission processes. This ability to dynamically adjust the manner in which data packets are transmitted through the networked computing environment 102 provides redundancy to the networked computing environment 102 that results in more efficient data packet transmission rates. Data regarding the ability of the edge nodes 110 to transmit data including their load-balancing weights and current state may be shared by the control node 112 with external devices such as the ingress edge node 402 to ensure that a most efficient communication path is selected.

Based on the network configurations and processes described in connection with FIGS. 2 through 4, the edge nodes 110 are removed from major data processing functions including control plane processing, and these functions are pushed to the control node 112. In this manner, physical or other communicative connections between the edge nodes 110 may be eliminated. Further, the edge nodes 110 are left to perform data plane processing of packets. The control node 112 performs and manages the control plane processing including, for example, bundling, synchronization of the edge nodes 110, and load balancing of network traffic, among other control plane processing, and functions as an LACP state machine and LISP Map-Server/Map-Resolver (MSMR) device.

In one example, the control node 112 may control any number of bundles within the networked computing environment 102. Further, in one example, any number of control nodes 112 may be included within the networked computing environment 102 to control separate bundles of edge nodes 110.

Figure 5:
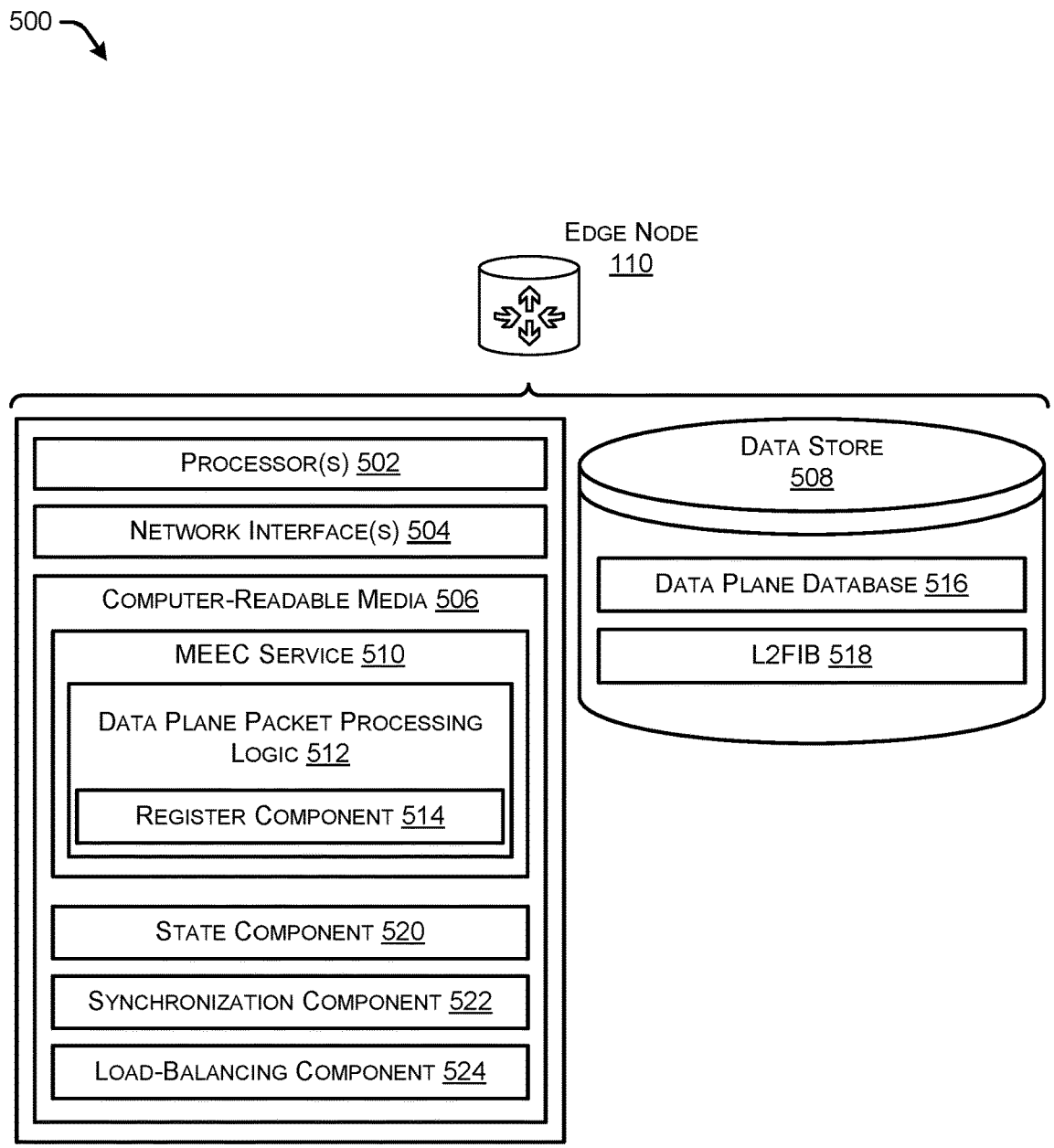
FIG. 5 is a component diagram of example components of an edge node, according to an example of the principles described herein.

FIG. 5 is a component diagram 500 of example components of an edge node 110, according to an example of the principles described herein. As illustrated, the edge node 110 may include one or more hardware processors 502 (processors), one or more devices, configured to execute one or more stored instructions. The processor(s) 502 may comprise one or more cores. Further, the edge node 110 may include one or more network interfaces 504 configured to provide communications between the edge node 110 and other devices, such as the server 114, control node 112, and/or other systems or devices associated with the edge node 110 and/or remote from the edge node 110. The network interfaces 504 may include devices configured to couple to personal area networks (PANs), wired and wireless local area networks (LANs), wired and wireless wide area networks (WANs), and so forth. For example, the network interfaces 504 may include devices compatible with Ethernet, Wi-Fi, and so forth.

The edge node 110 may also include computer-readable media 506 that stores various executable components (e.g., software-based components, firmware-based components, etc.). In addition to various components discussed in FIGS. 1 through 4, the computer-readable media 506 may further store components to implement functionality described herein. While not illustrated, the computer-readable media 506 may store one or more operating systems utilized to control the operation of the one or more devices that comprise the edge node 110. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) may comprise the UNIX operating system or one of its variants. It should be appreciated that other operating systems may also be utilized.

Additionally, the edge node 110 may include a data store 508 which may comprise one, or multiple, repositories or other storage locations for persistently storing and managing collections of data such as databases, simple files, binary, and/or any other data. The data store 508 may include one or more storage locations that may be managed by one or more database management systems.

The computer-readable media 506 may store portions, or components, of a MEEC service 510 described herein. For instance, the MEEC service 510 of the computer-readable media 506 may store data plane packet processing logic 512 to, when executed by the processor(s) 502, register system identification (sys_id) data such as MAC addresses and RLOCs of any number of devices within the networked computing environment 102. The data plane packet processing logic 512 enables the edge nodes 110 to receive and process data packets over the data plane (e.g., LACP PDUs), and process the data packets for control plane packet processing with respect to the control node 112. The data plane packet processing logic 512 may include a register component 514. The register component 514 may, when executed by the processor(s) 502, store the PDU data packets, data defining at least one bundle of a plurality of links communicatively coupling the plurality of edge nodes 110 and the server 114, data identifying the server 114 (e.g., Sys ID (sys_id), a MAC address, among others), EIDs, RLOCs, and other data. This data may be stored within a data plane database 516 (e.g., an LACP database) and/or an L2FIB 518 as described herein.

The computer-readable media 506 may also include a state component 520 to, when executed by the processor(s) 502, place the edge node 110 as defined by the server 114 and/or the control node 112. The states may include, for example, a bundled state, a hot-standby state, an active state, an inactive state, among other states. The state component 520 may be executed when the edge node 110 receives a LISP map-notify message from the control node 112 where the control node 112, acting as an LACP state-machine, assigns the state to the edge node 110. Although depicted as part of the computer-readable media 506, the state component 520 may be part of the MEEC service 510.

The computer-readable media 506 may also include a synchronization component 522 to, when executed by the processor(s) 502, receive a LISP map-register message and/or a map-proxy register message from the control node 112 that defines data for registration of the MAC address (or other Sys ID) in, for example, the data plane database 516 and/or the L2FIB 518. The synchronization component 522, when executed by the processor(s) 502, may also register the data provided within the LISP map-register message and/or a map-proxy register message. Again, although depicted as part of the computer-readable media 506, the synchronization component 522 may be part of the MEEC service 510.

The computer-readable media 506 may also include a load-balancing component 524 to, when executed by the processor(s) 502, distribute data packet transmission over a set of resources such as the edge nodes 110, with the aim of making their overall data packet transmission processing more efficient, optimize the response time for each data packet transmission, and avoid unevenly overloading one or more of the edge nodes 110 nodes while other edge nodes 110 are left idle. In one example, the control node 112 may perform load balancing with respect to the edge nodes 110. However, in one example, an edge node 110 may further load balance data packet transmission processing over a plurality of links from that edge node 110 to the server 114. Again, although depicted as part of the computer-readable media 506, the load-balancing component 524 may be part of the MEEC service 510.

Figure 6:
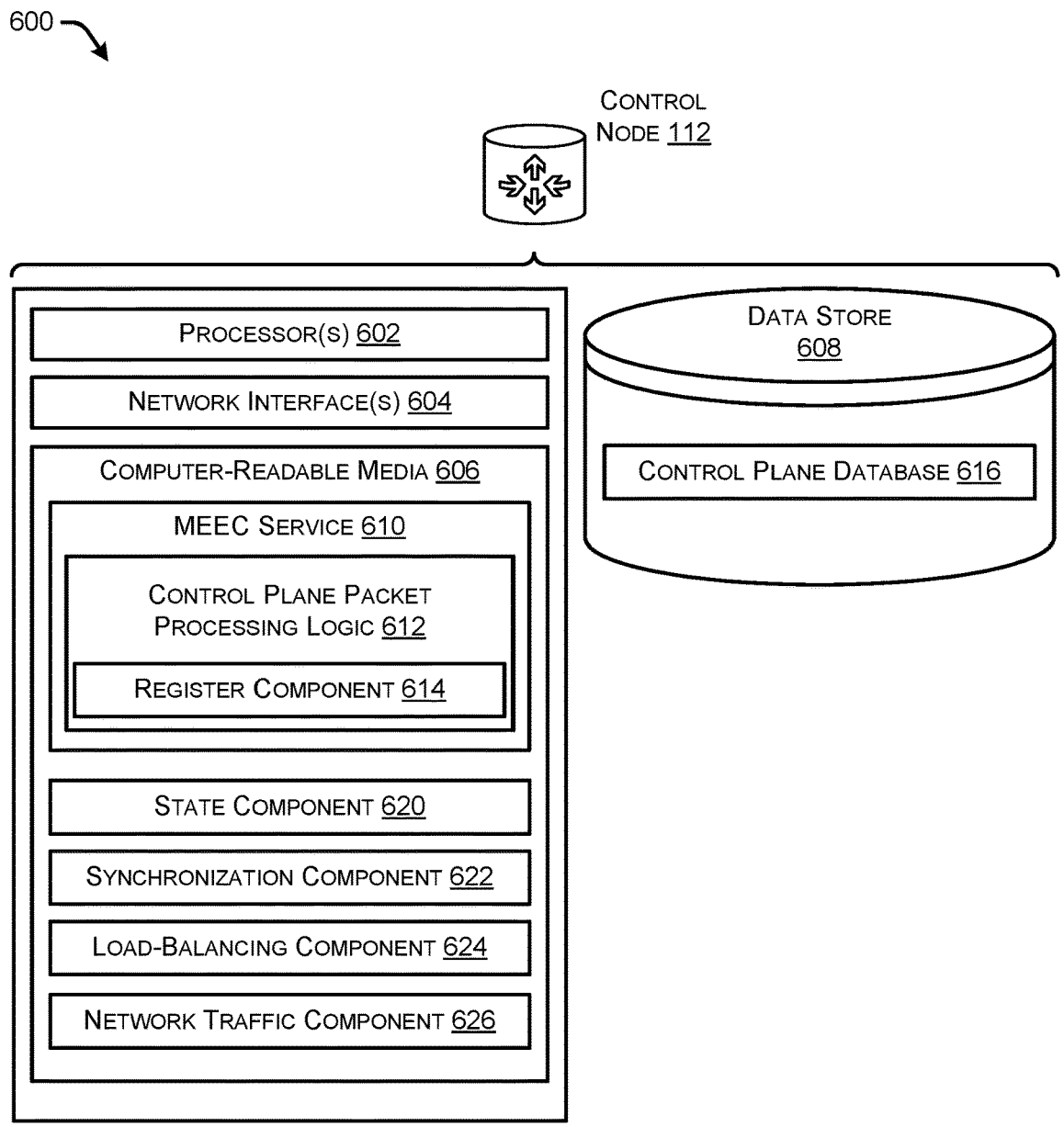
FIG. 6 is a component diagram of example components of a control node, according to an example of the principles described herein.

FIG. 6 is a component diagram 600 of example components of a control node, according to an example of the principles described herein. As illustrated, the control node 112 may include one or more hardware processors 602 (processors), one or more devices, configured to execute one or more stored instructions. The processor(s) 602 may comprise one or more cores. Further, the control node 112 may include one or more network interfaces 604 configured to provide communications between the control node 112 and other devices, such as the server 114, the edge nodes 110, and/or other systems or devices associated with the control node 112 and/or remote from the control node 112. The network interfaces 604 may include devices configured to couple to personal area networks (PANs), wired and wireless local area networks (LANs), wired and wireless wide area networks (WANs), and so forth. For example, the network interfaces 504 may include devices compatible with Ethernet, Wi-Fi, and so forth.

The control node 112 may also include computer-readable media 606 that stores various executable components (e.g., software-based components, firmware-based components, etc.). In addition to various components discussed in FIGS. 1 through 4, the computer-readable storage-media 606 may further store components to implement functionality described herein. While not illustrated, the computer-readable media 606 may store one or more operating systems utilized to control the operation of the one or more devices that comprise the control node 112. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) may comprise the UNIX operating system or one of its variants. It should be appreciated that other operating systems may also be utilized.

Additionally, the control node 112 may include a data store 608 which may comprise one, or multiple, repositories or other storage locations for persistently storing and managing collections of data such as databases, simple files, binary, and/or any other data. The data store 608 may include one or more storage locations that may be managed by one or more database management systems.

The computer-readable media 606 may store portions, or components, of the MEEC service 610 described herein. For instance, the MEEC service 510 of the computer-readable media 606 may store control plane packet processing logic 612 to, when executed by the processor(s) 602, perform the functionalities of control node 112 as a LISP map-server/map-resolver (MSMR) device as well as an LACP state machine. For example, the control plane packet processing logic 612, when executed by the processor(s) 602, may cause the control node 112 to receive map-register messages (e.g., LISP map-register messages) from the edge nodes 110. The map-register messages may include data such as, for example, system identification (sys_id) data such as MAC addresses, and EIDs and/or RLOCs of any number of devices within the networked computing environment 102.

Further, the control plane packet processing logic 612 enables the control nodes 112 to receive and process data packets over the control plane (e.g., LISP messages), and process the data packets for control plane packet processing with respect to the control node 112 and data plane packet processing with respect to the edge nodes 110. The control plane packet processing logic 612 may include a register component 614. The register component 618 may, when executed by the processor(s) 602, register and store data defined within the map-register messages (e.g., LISP messages) transmitted from the edge nodes 110. The data defined within the LISP messages may include, for example, system and link properties of the edge nodes 110 and the server 114 as described herein including the system identification (sys_id) data such as MAC addresses, and EIDs and/or RLOCs of any number of devices within the networked computing environment 102 described above. Further, the register component 614, when executed by the processor(s) 602, stores the system and link properties of the edge nodes 110 and the server 114 as received within the map-register messages within a control plane database 616 (e.g., an LISP database) of the data store 608 of the control node 112.

The computer-readable media 606 may also include a state component 620 to, when executed by the processor(s) 602, define a number of states of the edge nodes 110 along with, in some example, the server 114. Again, the states may include, for example, a bundled state, a hot-standby state, an active state, an inactive state, among other states. The state component 620 may be executed when the control node 112 prepares and sends a LISP map-notify message to the edge nodes 110. In this manner, the control node 112 acts as an LACP state-machine by assigning the state to the edge nodes 110. Although depicted as part of the computer-readable media 606, the state component 620 may be part of the MEEC service 610.

The computer-readable media 606 may also include a synchronization component 622 to, when executed by the processor(s) 602, send at least one LISP map-register message and/or a map-proxy register message from the control node 112 to the edge nodes 110 within a bundle that defines data for registration of the MAC address (or other Sys ID) in, for example, the data plane databases 516 and/or the L2FIBs 518 of the edge nodes 110. The synchronization component 622, when executed by the processor(s) 602, may also provide instructions to the edge nodes 110 to cause the edge nodes 110 to register the data provided within the LISP map-register message and/or a map-proxy register message. Again, although depicted as part of the computer-readable media 606, the synchronization component 622 may be part of the MEEC service 610.

The computer-readable media 606 may also include a load-balancing component 624 to, when executed by the processor(s) 602, distribute data packet transmissions over a set of resources such as the edge nodes 110, with the aim of making their overall data packet transmission processing more efficient, optimize the response time for each data packet transmission, and avoid unevenly overloading one or more of the edge nodes 110 nodes while other edge nodes 110 are left idle. In one example, the control node 112 may perform load balancing with respect to the edge nodes 110. Again, although depicted as part of the computer-readable media 606, the load-balancing component 624 may be part of the MEEC service 610.

The computer-readable media 606 may also include a network traffic component 626 to, when executed by the processor(s) 602, to assign at least one of the edge nodes 110 as an ingress edge node and at least one of the edge nodes 110 as an egress edge node when a data packet is sent from an external device such as a server 404 to the server 114. The processor(s) 602 of the control node 112 may execute the network traffic component 626 to also direct traffic from the assigned ingress edge node 402 to the at least one edge node 110 for relaying that data packet to the server 114.

The computer-readable media 506, 606 of the edge nodes 110 and the control node 112 as depicted in FIGS. 5 and 6 may be used to store and retrieve information, such as program modules, data structures, or other data. It should be appreciated by those skilled in the art that computer-readable media 506 is any available media that provides for the non-transitory storage of data and that may be accessed by the edge node 110. In some examples, the operations performed by the edge node 110, and or any components included therein, may be supported by one or more server devices. Stated otherwise, some or all of the operations performed by the edge node 110, and or any components included therein, may be performed by one or more computer devices operating in a cloud-based arrangement.

By way of example, and not limitation, computer-readable media 206 may include volatile and non-volatile, removable, and non-removable media implemented in any method or technology. Computer-readable media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion.

Figure 7:
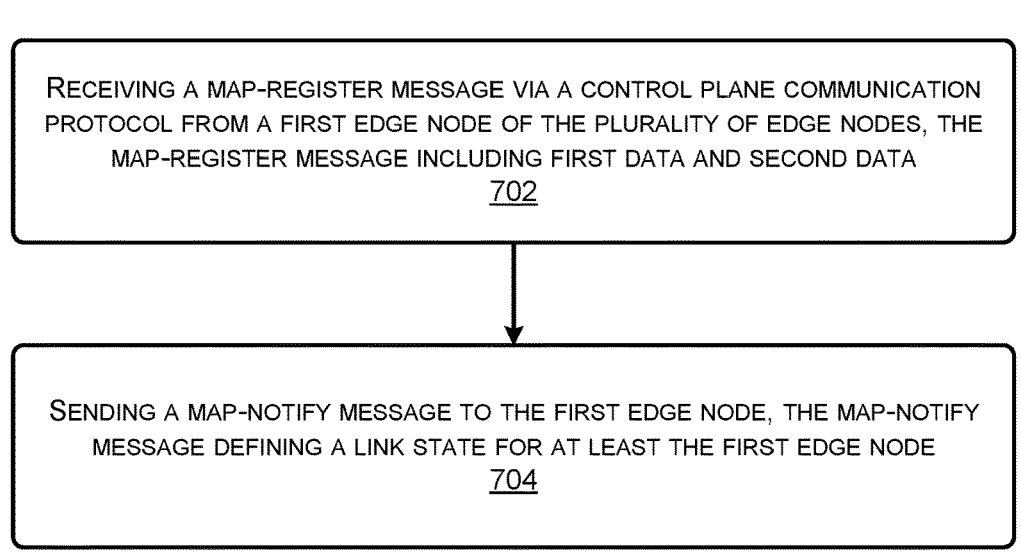
FIG. 7 illustrates a flow diagram of an example method for creating a Multi-Edge EtherChannel (MEEC), according to an example of the principles described herein.
Figure 8:
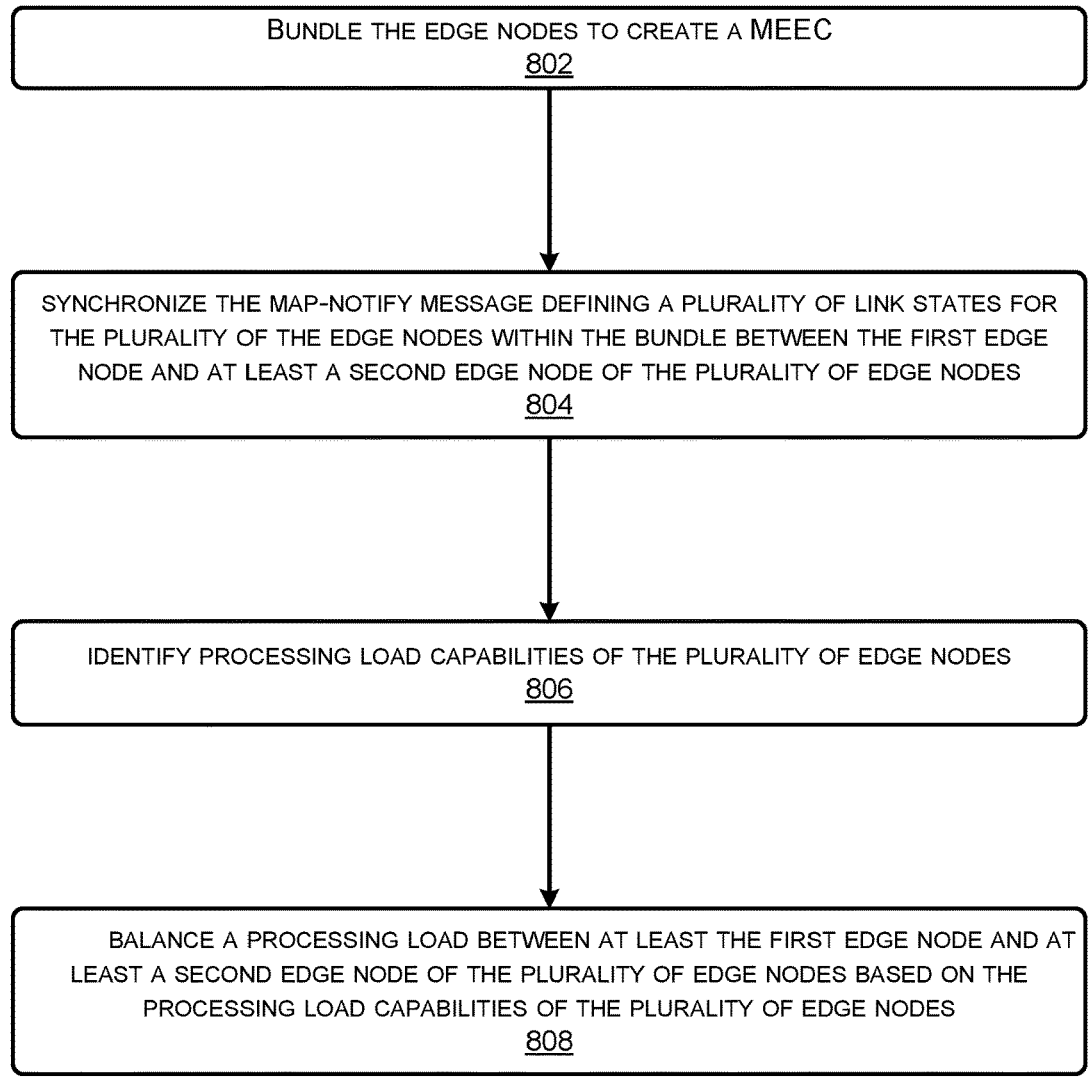
FIG. 8 illustrates a flow diagram of an example method for administering an MEEC, according to an example of the principles described herein.

FIGS. 7 and 8 illustrate flow diagrams of example methods that illustrate various aspects of the techniques of this disclosure. The logical operations described herein with respect to FIGS. 7 and 8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and/or any combination thereof. It should also be appreciated that more or fewer operations might be performed than shown in the FIGS. 7 and 8 and described herein. These operations may also be performed in parallel, or in a different order than those described herein. Some or all of these operations may also be performed by components other than those specifically identified. Although the techniques described in this disclosure is with reference to specific components, in other examples, the techniques may be implemented by less components, more components, different components, or any configuration of components.

FIG. 7 illustrates a flow diagram of an example method 700 for creating a Multi-Edge EtherChannel (MEEC) 202, according to an example of the principles described herein. Some or all of the various operations shown in example method 700 may be performed by the various hardware and/or software resources described above in FIGS. 1 through 6, such as the edge nodes 110, the control node 112, the server 114, their respective sub-elements, and other devices and elements described herein.

The method 700 may include, with the control node 112 communicatively coupled to a plurality of edge nodes 110 within a networked computing environment 102, receiving 702 a map-register message via a control plane communication protocol from a first edge node 110-1 of the plurality of edge nodes 110. The map-register message may include first data defining a bundle of a plurality of links communicatively coupling the plurality of edge nodes 110 and the server 114 via a data plane communication protocol. Further, the map-register message may include second data identifying the server 114 (e.g. Sys ID (sys_id), MAC address, or other identification data) to which the plurality of edge nodes 110 included within the bundle are communicatively coupled.

The method 700 may further include sending 704 a map-notify message to the first edge node 110-1. The map-notify message may define a link state for at least the first edge node 110-1. In this manner, the first edge node 110-1 is bundled along with at least one of the other edge nodes 110 within the networked computing environment 102. More details regarding the bundling of links within the networked computing environment 102 is described herein in connection with, for example, FIG. 2.

FIG. 8 illustrates a flow diagram of an example method 800 for administering an MEEC 202, according to an example of the principles described herein. The MEEC 202 may be administered by first bundling a number of links between the edge nodes 110 and the server, synchronizing the edge nodes 110 within the bundle, and transmitting ingress data packet transmissions within the networked computing environment 102 to the server 114 in a load-balanced manner. Thus, the method 800 of FIG. 8 may include bundling 802 the edge nodes 110 within the networked computing environment 102 to create the MEEC 202. This may be accomplished by the edge nodes 110 and the control node 112 executing their respective MEEC services 510, 610 via the processor(s) 502, 602 to receive a map-register message via a control plane communication protocol from a first edge node 110-1 of the plurality of edge nodes 110, and sending a map-notify message to the first edge node 110-1 as described above in connection with FIG. 7.

The method 800 of FIG. 8 may further include, with the control node 112, synchronizing 804 the map-notify message defining a plurality of link states for the plurality of the edge nodes 110 within the bundle between the first edge node 110-1 and at least a second edge node 110-2, 110-N of the plurality of edge nodes 110. As detailed in FIG. 3, the control node 112 may create and transmit a LISP map-proxy register message to least one of the other SDA edge nodes 110 that has an active link included within the bundle such as, for example, edge nodes 110-2, 110-N. This allows the at least one other SDA edge node 110 to also register the source MAC address of the server 114, resulting in the synchronization of the edge nodes 110 within the networked computing environment 102. As a result, all independent edge nodes 110 that are in the same bundle (e.g., are Multi-Edge EtherChannel (MEEC) 202 enabled), may be fully synchronized from a MAC programming perspective and a packet forwarding perspective.

At 806, the method 800 may further include identifying processing load capabilities of the plurality of the edge nodes 110. In order to balance processing loads between the edge nodes 110, the method 800 may also include balancing 808 a processing load between at least the first edge node 110-1 and at least a second edge node 110-2, 110-N of the plurality of edge nodes 110 based on the processing load capabilities of the plurality of edge nodes 110 identified at 806. In one example, a first communication session may be established with an external device such as server 404 via a data plane communication protocol. The first communication session may include at least one protocol data unit (PDU) packet from the server 404. The first edge node 110-1 may send a map-register message via a control plane communication protocol to the control node 112 communicatively coupled to the plurality of edge nodes 110. The map-register message may include a request to provide an indication of server 114 to which the PDU packet is destined. A map-reply message may be received at the edge node 402 indicating load balancing data of at least a second edge node 110-1 and a third edge node 110-2 of the plurality of edge nodes 110 through which the server 114 is reachable. The PDU packet may be sent to the server 114 via the second edge node 110-1 and/or the third edge node 110-2 based on the load balancing data such as the load balancing capabilities identified at 806.

Figure 9:
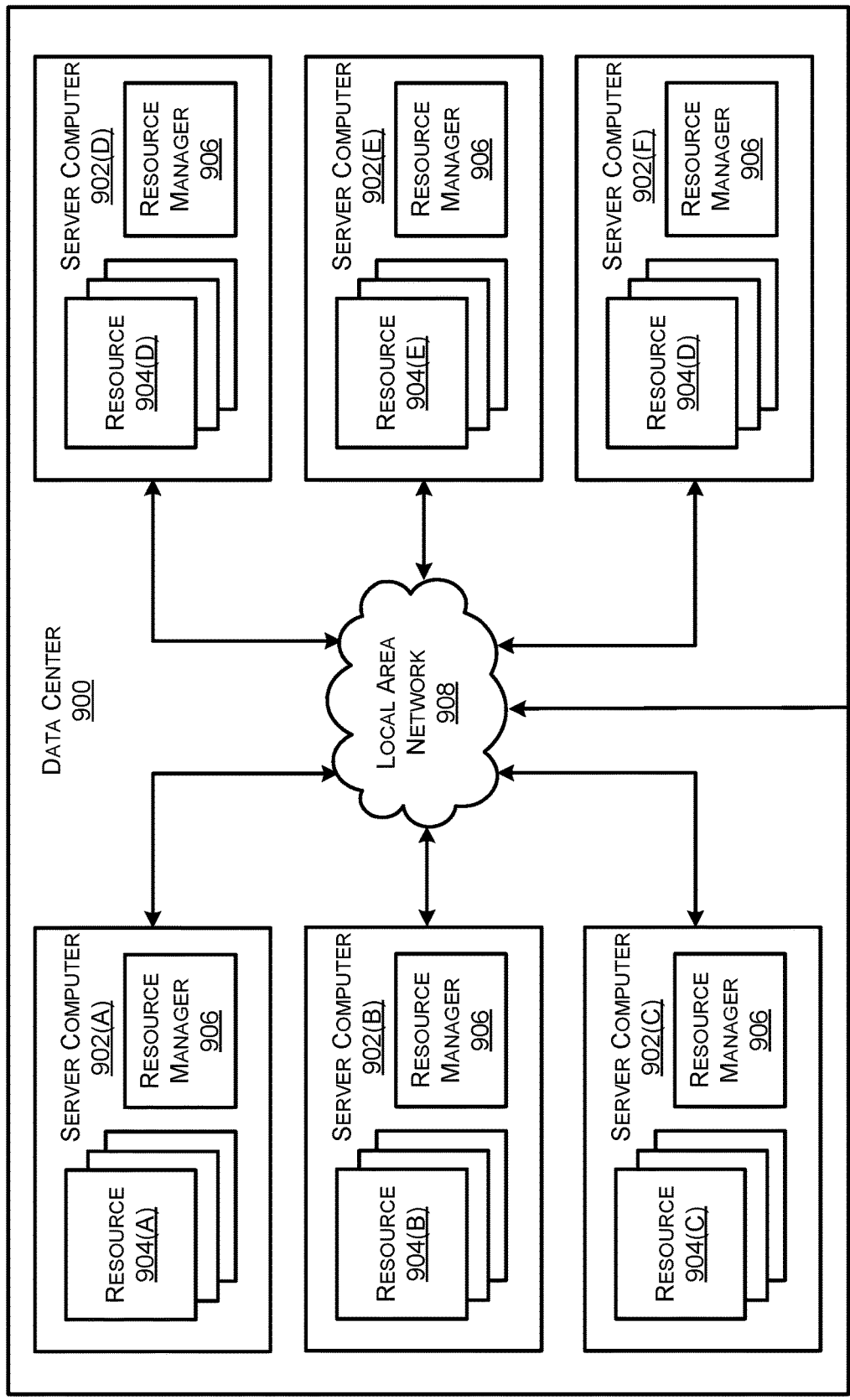
FIG. 9 illustrates a computing system diagram illustrating a configuration for a data center that may be utilized to implement aspects of the technologies disclosed herein.

FIG. 9 illustrates a computing system diagram illustrating a configuration for a data center 900 that may be utilized to implement aspects of the technologies disclosed herein. The example data center 900 shown in FIG. 9 includes several server computers 902A-902F (which might be referred to herein singularly as "a server computer 902" or in the plural as "the server computers 902") for providing computing resources. In some examples, the resources and/or server computers 902 may include, or correspond to, the any type of networked device described herein. Although described as servers, the server computers 902 may comprise any type of networked device, such as servers, switches, routers, hubs, bridges, gateways, modems, repeaters, access points, etc.

The server computers 902 may be standard tower, rack-mount, or blade server computers configured appropriately for providing computing resources. In some examples, the server computers 902 may provide computing resources 904 including data processing resources such as VM instances or hardware computing systems, database clusters, computing clusters, storage clusters, data storage resources, database resources, networking resources, VPNs, and others. Some of the servers 902 may also be configured to execute a resource manager 906 capable of instantiating and/or managing the computing resources. In the case of VM instances, for example, the resource manager 906 may be a hypervisor or another type of program configured to enable the execution of multiple VM instances on a single server computer 902. Server computers 902 in the data center 900 may also be configured to provide network services and other types of services.

In the example data center 900 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 900, between each of the server computers 902A-902F in each data center 900, and, potentially, between computing resources in each of the server computers 902. It should be appreciated that the configuration of the data center 900 described with reference to FIG. 9 is merely illustrative and that other implementations may be utilized.

In some examples, the server computers 902 and or the computing resources 904 may each execute/host one or more tenant containers and/or virtual machines to perform techniques described herein.

In some instances, the data center 900 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 904 provided by the cloud computing network may include various types of computing resources, such as data processing resources like tenant containers and VM instances, data storage resources, networking resources, data communication resources, network services, VPN instances, and the like.

Each type of computing resource 904 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 904 not mentioned specifically herein.

The computing resources 904 provided by a cloud computing network may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 may also be located in geographically disparate locations. One illustrative embodiment for a data center 900 that may be utilized to implement the technologies disclosed herein will be described below with regard to FIG. 10.

Figure 10:
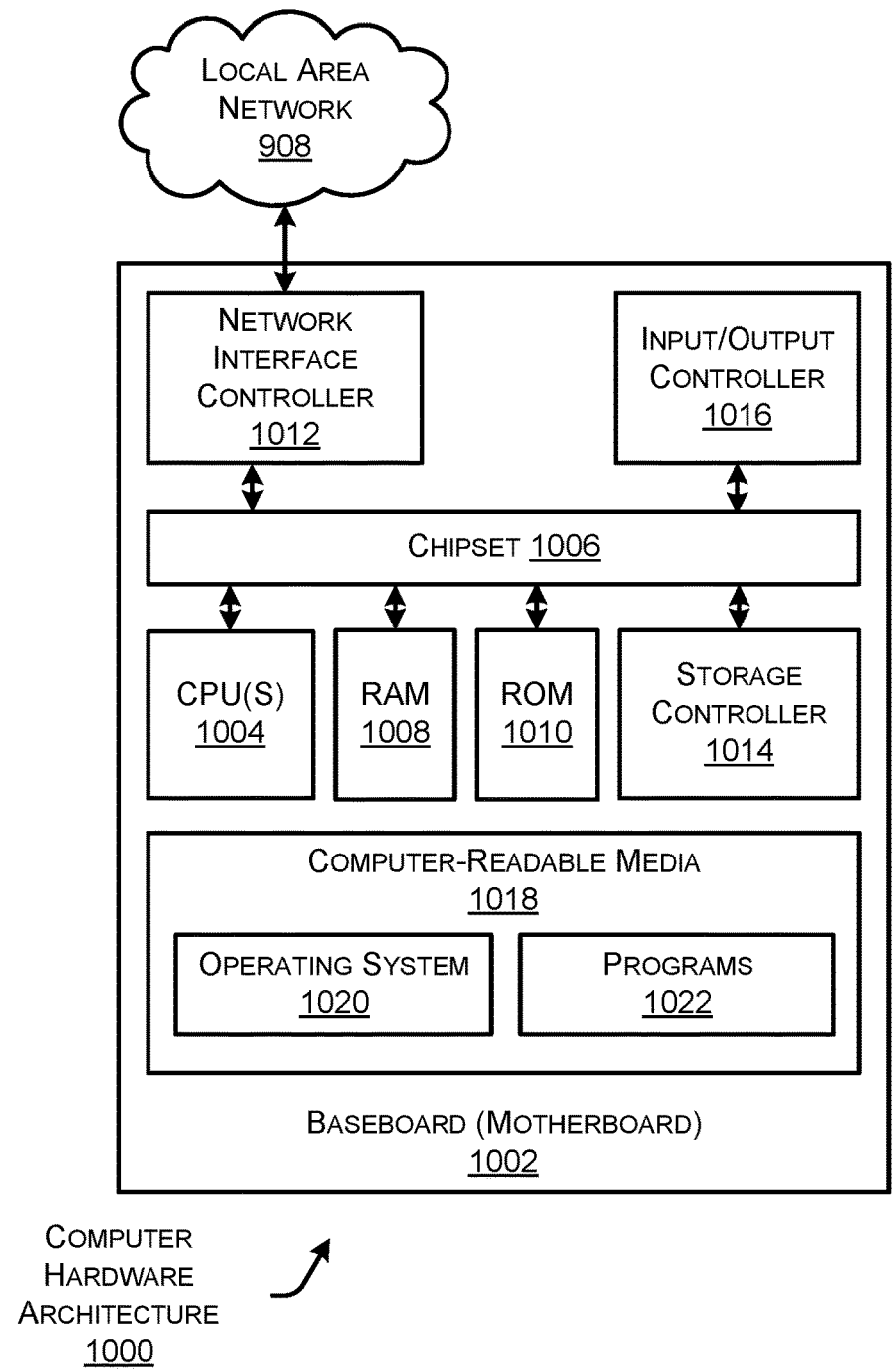
FIG. 10 illustrates a computer architecture diagram showing an example computer hardware architecture for implementing a computing device that may be utilized to implement aspects of the various technologies presented herein.

FIG. 10 illustrates a computer architecture diagram showing an example computer hardware architecture 1000 (e.g., a server computer 902) for implementing a computing device that may be utilized to implement aspects of the various technologies presented herein. The computer hardware architecture 1000 shown in FIG. 10 illustrates a conventional server computer 902, computing resource 114, network device (e.g., edge node 110, control node 112, data store 508, 608, etc.), workstation, desktop computer, laptop, tablet, network appliance, e-reader, smartphone, or other computing device, and may be utilized to execute any of the software components presented herein. The computer 1000 may, in some examples, correspond to a device included within the networked computing environment 102 described herein, and may comprise networked devices such as servers, switches, routers, hubs, bridges, gateways, modems, repeaters, access points, etc.

The computer 1000 includes a baseboard 1002, or "motherboard," which is a printed circuit board to which a multitude of components or devices may be connected by way of a system bus or other electrical communication paths. In one illustrative configuration, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a RAM 1008, used as the main memory in the computer 1000. The chipset 1006 may further provide an interface to a computer-readable media such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the configurations described herein.

The computer 1000 may operate in a networked environment using logical connections to remote computing devices and computer systems through a network, such as the network 108. The chipset 1006 may include functionality for providing network connectivity through a Network Interface Controller (NIC) 1012, such as a gigabit Ethernet adapter. The NIC 1012 is capable of connecting the computer 1000 to other computing devices over the network 108. It should be appreciated that multiple NICs 1012 may be present in the computer 1000, connecting the computer to other types of networks and remote computer systems. In some examples, the NIC 1012 may be configured to perform at least some of the techniques described herein, such as packet redirects and/or other techniques described herein.

The computer 1000 may be connected to a computer-readable media 1018 that provides non-volatile storage for the computer. The computer-readable media 1018 may store an operating system 1020, programs 1022, and data, which have been described in greater detail herein. The computer-readable media 1018 may be connected to the computer 1000 through a storage controller 1014 connected to the chipset 1006. The computer-readable media 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the computer-readable media 1018 by transforming the physical state of the physical storage units to reflect the information being stored. The specific transformation of physical state may depend on various factors, in different embodiments of this description. Examples of such factors may include, but are not limited to, the technology used to implement the physical storage units, whether the computer-readable media 1018 is characterized as primary or secondary storage, and the like.

For example, the computer 1000 may store information to the computer-readable media 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the computer-readable media 1018 by detecting the physical states or characteristics of one or more particular locations within the physical storage units.

In addition to the computer-readable media 1018 described above, the computer 1000 may have access to other computer-readable media to store and retrieve information, such as program modules, data structures, or other data. It should be appreciated by those skilled in the art that computer-readable media is any available media that provides for the non-transitory storage of data and that may be accessed by the computer 1000. In some examples, the operations performed by the network 108 and or any components included therein, may be supported by one or more devices similar to computer 1000. Stated otherwise, some or all of the operations performed by the network 108, and or any components included therein, may be performed by one or more computer devices 1000 operating in a cloud-based arrangement.

By way of example, and not limitation, computer-readable media may include volatile and non-volatile, removable, and non-removable media implemented in any method or technology. Computer-readable media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion.

As mentioned briefly above, the computer-readable media 1018 may store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX operating system or one of its variants. It should be appreciated that other operating systems may also be utilized. The computer-readable media 1018 may store other system or application programs and data utilized by the computer 1000.

In one embodiment, the computer-readable media 1018 or other computer-readable media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable media storing computer-executable instructions which, when executed by the computer 1000, perform the various processes described above with regard to FIGS. 1-4. The computer 1000 may also include computer-readable media having instructions stored thereupon for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, an input/output controller 1016 may provide output to a display, such as a computer monitor, a flat-panel display, a digital projector, a printer, or other type of output device. It will be appreciated that the computer 1000 might not include all of the components shown in FIG. 10, may include other components that are not explicitly shown in FIG. 10, or might utilize an architecture completely different than that shown in FIG. 10.

As described herein, the computer 1000 may comprise one or more of a client device 106 or a network device (e.g., server computer 902, server 114, edge node 110, control node 112, etc.). The computer 1000 may include one or more CPUs 1004 (e.g., processors) configured to execute one or more stored instructions. The CPU(s) 1004 may comprise one or more cores. Further, the computer 1000 may include one or more network interfaces configured to provide communications between the computer 1000 and other devices, such as the communications described herein as being performed by the client devices 106 and computing resources 114 The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1022 may comprise any type of programs or processes to perform the techniques described in this disclosure for determining connectivity in multi-hop paths using bidirectional forwarding detection (BFD) Echo packet(s). The programs 1022 may enable the computing resources 114 to perform various operations.

The systems and methods described herein provide node devices that are not required to be stacked physically with associated stacked-device wiring. This avoids a stack switch network configuration where the node devices have to otherwise perform control plane processes for synchronization purposes. Further, the systems and methods described herein avoid LACP convergence between edge nodes using "dedicated" protocol used for LACP convergence to ensure that the edge nodes acting as state machines are in sync. This processing is instead pushed to the control node 112 such that the control node 112 functions as a LISP map-server/map-resolver (MSMR) device as well as the LACP state machine.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing instructions that, when executed by the one or more processors, cause the one or more processors to perform operations comprising:
with a control node communicatively coupled to a plurality of edge nodes within a network, receiving a map-register message via a control plane communication protocol from a first edge node of the plurality of edge nodes, the control plane communication protocol being a locator/identifier separation protocol (LISP) and the map-register message including:
an endpoint identifier (EID) of a first server;
routing locators (RLOCs) of the plurality of edge nodes;
first data defining a bundle of a plurality of links communicatively coupling the plurality of edge nodes and the first server via a data plane communication protocol; and
second data identifying the first server to which the plurality of edge nodes included within the bundle are communicatively coupled; and
sending a map-notify message to the first edge node, the map-notify message defining a link state for at least the first edge node.

2. The system of claim 1, the operations further comprising, with the control node, synchronizing the map-notify message defining a plurality of link states for the plurality of the edge nodes within the bundle between the first edge node and at least a second edge node of the plurality of edge nodes.

3. The system of claim 1, the operations further comprising, with the control node:
identifying processing load capabilities of the plurality of edge nodes; and
balancing a processing load between at least the first edge node and at least a second edge node of the plurality of edge nodes based on the processing load capabilities of the plurality of edge nodes.

4. The system of claim 1, wherein the data plane communication protocol includes link aggregation control protocol (LACP) or port aggregation protocol (PAgP).

5. The system of claim 1, wherein the control plane communication protocol further includes border gateway protocol (BGP), or Ethernet protocol.

6. The system of claim 1, the operations further comprising:
storing the first data and the second data for the plurality of edge nodes in a database of the control node; and
creating a map-proxy register message for dissemination to the plurality of edge nodes to register the bundle of the plurality of links and an identification of the first server with the plurality of edge nodes.

7. The system of claim 1, the operations further comprising, with the control node, defining a state of at least the first edge node.

8. The system of claim 1, the operations further comprising:
with the control node:
receiving the map-register message via the control plane communication protocol from the first edge node, the map-register message further including a request to provide an indication of the first server to which a PDU packet from a second server is destined;
sending a map-reply message indicating load balancing data of at least a second edge node and a third edge node of the plurality of edge nodes through which the first server is reachable; and
sending the PDU packet to the first server via the second edge node or the third edge node based on the load balancing data.

9. The system of claim 8, wherein the indication of the first server comprises:
the EID of the first server; and
the RLOCs of the plurality of edge nodes within the bundle.

10. A system comprising:
one or more processors; and
one or more non-transitory computer-readable media storing instructions that, when executed by the one or more processors, cause the one or more processors to perform operations comprising:
with a first edge node of a plurality of edge nodes within a network:
establishing a first communication session with a first server via a data plane communication protocol, the first communication session including at least one protocol data unit (PDU) packet from the first server;
sending a map-register message via a control plane communication protocol to a control node communicatively coupled to the plurality of edge nodes, the control plane communication protocol comprising locator/identifier separation protocol (LISP), and the map-register message including:
an endpoint identifier (EID) of a first server;
routing locators (RLOCs) of the plurality of edge nodes; and
a request to provide an indication of a second server to which the PDU packet is destined;
receiving a map-reply message indicating load balancing data of at least a second edge node and a third edge node of the plurality of edge nodes through which the second server is reachable; and
sending the PDU packet to the second server via the second edge node or the third edge node based on the load balancing data.

11. The system of claim 10, wherein the map-register message further includes:

first data defining at least one bundle of a plurality of links communicatively coupling the plurality of edge nodes and the second server; and second data identifying the second server to which the plurality of edge nodes included within the bundle are communicatively coupled, the operations further comprising, with the first edge node:

storing the first data and the second data in a database of the first edge node;

creating a forwarding information base (FIB) table including the first data, the second data, and third data defining a load capacity of at least the first edge node; and receiving, from the control node, a map-notify message, the map-notify message defining a link state for at least the first edge node.

12. The system of claim 11, the operations further comprising, with the first edge node:

receiving a map-proxy register message, the map-proxy register message including a network address of the second server; and storing the network address of the second server in the database and the FIB table.

13. The system of claim 11, the operations further comprising:

receiving a map-proxy register message, the map-proxy register message including a state of the at least the second edge node of the plurality of edge nodes; and storing the state of at least the second edge node in the database and the FIB table to synchronize the first edge node with the plurality of edge nodes.

14. A method comprising:

with a control node communicatively coupled to a plurality of edge nodes within a network:

receiving a map-register message via a control plane communication protocol from at least a first edge node of the plurality of edge nodes, the control plane communication protocol comprises locator/identifier separation protocol (LISP), and the map-register message including:

an endpoint identifier (EID) of a first server;

routing locators (RLOCs) of the plurality of edge nodes;

first data defining at least one bundle of a plurality of links communicatively coupling the plurality of edge nodes and a server; and second data identifying the server to which the plurality of edge nodes included within the bundle are communicatively coupled; and sending a map-proxy register message defining a plurality of link states for the plurality of the edge nodes within the bundle to at least a second edge node to synchronize the first edge node with respect to at least the second edge node of the plurality of edge nodes.

15. The method of claim 14, further comprising registering the first data and the second data for the plurality of edge nodes in a database of the control node.

16. The method of claim 15, further comprising sending a map-notify message to the first edge node, the map-notify message defining a first link state for at least the first edge node.

17. The method of claim 14, further comprising:

identifying processing load capabilities of the plurality of edge nodes; and balancing a processing load between at least the first edge node and at least the second edge node of the plurality of edge nodes based on the processing load capabilities of the plurality of edge nodes.

18. The method of claim 14, further comprising:

defining an ingress edge node among the plurality of edge nodes to receive a data packet directed to the server; and receiving, from the ingress edge node, a map-request to determine:

an endpoint identification (EID) of the server; and a routing locator (RLOC) of the plurality of edge nodes within the bundle.

19. The method of claim 18, further comprising:

sending a map-reply message to the ingress edge node, the map-reply message including:

third data defining the EID of the server;

fourth data defining the RLOC of the plurality of edge nodes within the bundle; and fifth data defining processing load capabilities of the plurality of edge nodes.

20. The method of claim 19, further comprising:

receiving, from the ingress edge node, a routing indication of at least the second edge node of the plurality of edge nodes through which load balanced traffic is to be directed based on the fifth data; and directing the data packet to the server based on the routing indication.

* * * * *